P. DOYLE.
REMOVABLE DRIVE CALK FOR HORSESHOES.
APPLICATION FILED MAY 15, 1916.
1,216,093.
Patented Feb. 13, 1917.
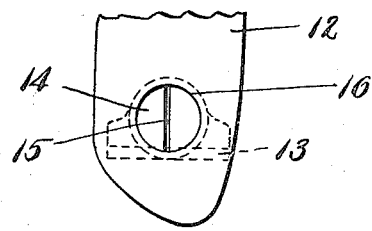
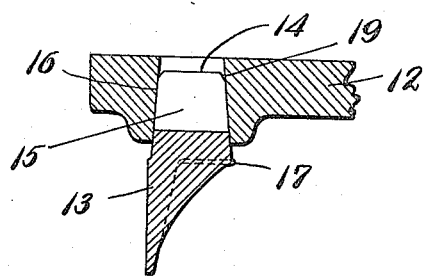
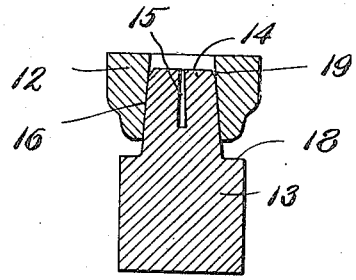
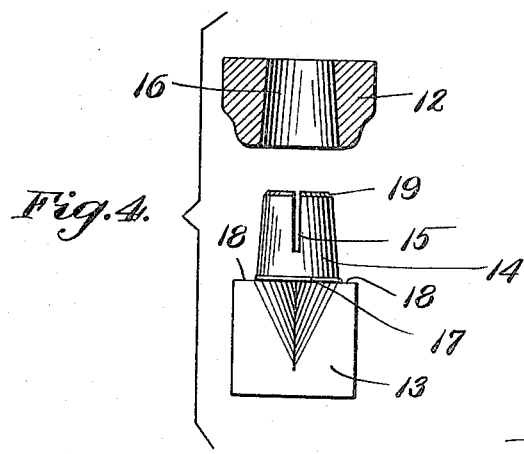
Inventor
Phillip Doyle
by A. W. Harrison
Atty.

UNITED STATES PATENT OFFICE.

PHILLIP DOYLE, OF SOMERVILLE, MASSACHUSETTS.

REMOVABLE DRIVE-CALK FOR HORSESHOES.

1,216,093.  Specification of Letters Patent.  Patented Feb. 13, 1917.

Application filed May 15, 1916. Serial No. 97,567.

*To all whom it may concern:*

Be it known that I, PHILLIP DOYLE, a citizen of the United States, of Somerville, in the county of Middlesex and State of Massachusetts, have invented certain new and useful Improvements in Removable Drive-Calks for Horseshoes, of which the following is a specification.

This invention relates to horseshoes and has particular reference to the calks thereof, especially to such calks as are readily secured in or to the shoe or removed therefrom.

The object of my invention is to provide an improved calk which may be easily secured in position by a driving action and will be firmly held, without requiring any screw threads or separate holding or locking means, the calk being readily removable without taking the shoe from the hoof of the animal.

In carrying out my invention I preferably make the calk of a quality of steel known as spring steel, this metal being employed because the calk is held in place solely by friction. So far as I am aware, prior attempts to produce calks which are held solely by friction have not been successful because of liability to drop out after more or less wear.

My invention consists in the improved calk and the combination of the same with a horseshoe substantially as hereinafter described and claimed.

Of the accompanying drawings,

Figure 1 is a top plan view of a heel portion of a horseshoe, having one of my improved calks secured thereto.

Figs. 2 and 3 are sectional views, the lines of section being in planes at a right angle to each other.

Fig. 4 represents one of my improved calks in elevation with a portion of a shoe in section above it.

Similar reference characters indicate similar parts in all of the views.

A portion of a horseshoe is indicated at 12. The calk illustrated comprises a body portion 13 having an integral tapering shank 14, the latter having a transverse vertical slit 15. The horseshoe is, of course, provided with sockets to receive the shanks of the calks. One such socket is shown at 16. It is tapering with its larger end at the bottom. In the accompanying drawings the amount of taper is slightly exaggerated in order to render the illustration clear.

At the bottom of the tapering shank of the calk is a partially annular rib 17, below which the calk extends out laterally to present shoulders 18, which may be engaged by a suitable extracting tool to enable the calk to be removed by pulling its shank out of the socket.

Preferably the upper end of the shank is slightly beveled as indicated at 19, this being to facilitate the entrance of the shank into the socket when the calk is to be driven to place.

The shank and socket are uniformly tapered throughout their coacting surfaces, but the shank is slightly larger in diameter than the internal diameter of the socket so that, when the calk is driven to place, it will reach a firmly seated or secured position before the lower or larger end of the shank, or the rib 17, reaches the bottom or larger end of the socket. Consequently, as the shoe with the calks is worn, there is opportunity for the calk to be forced farther and farther into the socket during use, without liability of the shank working loose so that the calk can drop away. In practice, the amount of taper is preferably such that the tip of the shank begins to bind almost at once upon entering the socket, the portions of the shank on opposite sides of the shank 15 yielding toward each other, as the shank is driven farther into the socket.

The slit 15 does not extend the full length of the shank, but terminates short of the large end thereof whereby said large end is left solid. This is to prevent the shank from being driven too far into the socket, while still permitting the shank to work farther in, during use, if it or the socket wears. The wedging of the solid portion possesses, of course, some holding action, but the greater part of the holding action is due to those portions each side of the slit which cause sufficient friction with the socket walls to firmly hold the calk in spite of slight differences in diameter due to manufacture or wear.

As clearly shown by comparing the different figures of the drawings, the plane of the slit 15 is substantially at a right angle to the plane of the lower flattened portion of the calk. The calks are secured in position so that the full width of the flattened lower portion will be presented at a substantial right angle to the forward movement of the animal, as usual. If the transverse slit 15 should be formed in a plane parallel with the plane of the wide lower edge of the calk, then forward pulling movement of the animal would be liable to cause a leverage upon the shank that might sufficiently collapse the slit shank to loosen the calk. By having the plane of the slit 15 as above described, the presence of said slit will not permit the shank to collapse during forward pulling movement to any material extent greater than would be the case if the shank were solid. By splitting the shank as illustrated and described it is made resilient to a sufficient extent to cause the shank to be firmly seated and secured in the socket so that it cannot become accidentally removed during use and yet by employing a suitable extracting tool engaging the shoulders 18, the calk can be readily detached from the shoe.

What I claim is:

The combination with a horseshoe having an upwardly tapering socket, of a calk having an upwardly tapering shank, said socket and shank being circular in cross section, said shank having a transverse slit extending from its smaller end partially toward the larger end, said larger end being solid, whereby the solid larger end of the shank will be wedged in the larger end of the socket and prevented from working loose by the expansion of the slitted smaller end of the shank against the interior of the smaller end of the socket.

In testimony whereof I have affixed my signature.

PHILLIP DOYLE.

Copies of this patent may be obtained for five cents each, by addressing the "Commissioner of Patents, Washington, D. C."